United States Patent [19]

Neill et al.

[11] 4,380,002
[45] Apr. 12, 1983

[54] SECONDARY BRAKE PEDAL ASSEMBLY

[75] Inventors: Daniel L. Neill, Belleville; Paul Weiner, Pinckney, both of Mich.

[73] Assignee: Kelsey-Hayes Co., Romulus, Mich.

[21] Appl. No.: 98,102

[22] Filed: Nov. 28, 1979

[51] Int. Cl.³ .............................................. H01C 10/00
[52] U.S. Cl. ..................................... 338/153; 74/560; 338/176
[58] Field of Search ................. 338/47, 108, 153, 176, 338/198, 96; 74/512, 515, 560; 303/20, 7, 9, 15, 3; 73/1 B

[56] References Cited

U.S. PATENT DOCUMENTS

| | | | |
|---|---|---|---|
| 3,135,358 | 6/1964 | Greentree | 188/3 R |
| 3,423,135 | 1/1969 | Beltramo | 303/3 |
| 3,574,414 | 4/1971 | Jacob | 338/47 X |
| 3,610,699 | 10/1971 | Ladoniczki | 303/15 X |
| 3,882,442 | 5/1975 | Hubbard | 338/47 X |
| 4,233,587 | 11/1980 | Augustine | 338/153 X |

Primary Examiner—C. L. Albritton
Attorney, Agent, or Firm—Ralph J. Skinkiss; Paul F. Stutz

[57] ABSTRACT

A secondary and/or piggy-back brake pedal transducer assembly adapted to be secured to a primary brake pedal, said secondary or piggy-back pedal being moveable with respect to the primary brake pedal responsive to foot pressure and including novel spring means and an integral lever controlled by that said spring means, said lever being deflectible to correspondingly deflect a plunger member of a connected potentiometer to thereby develop an electric signal proportionate to said foot pressure, said signal being translatable to corresponding electrical energization of an electric brake situated on a vehicle towed by the vehicle bearing said secondary or piggy-back brake assembly.

6 Claims, 9 Drawing Figures

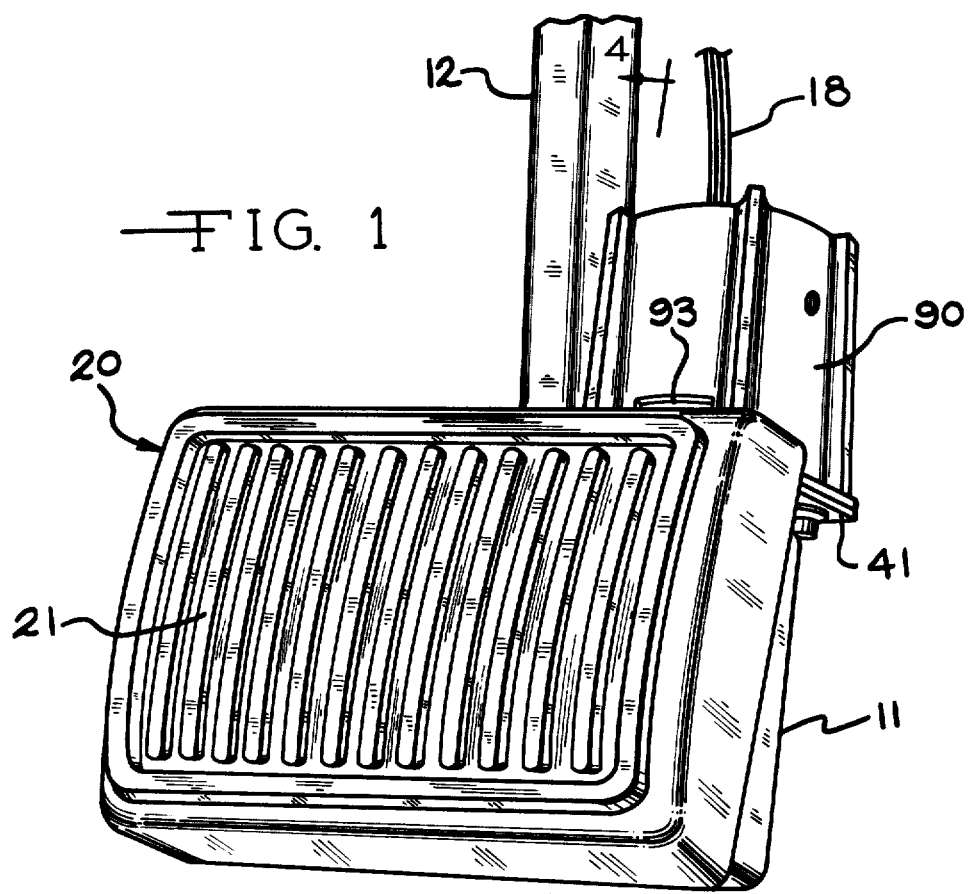
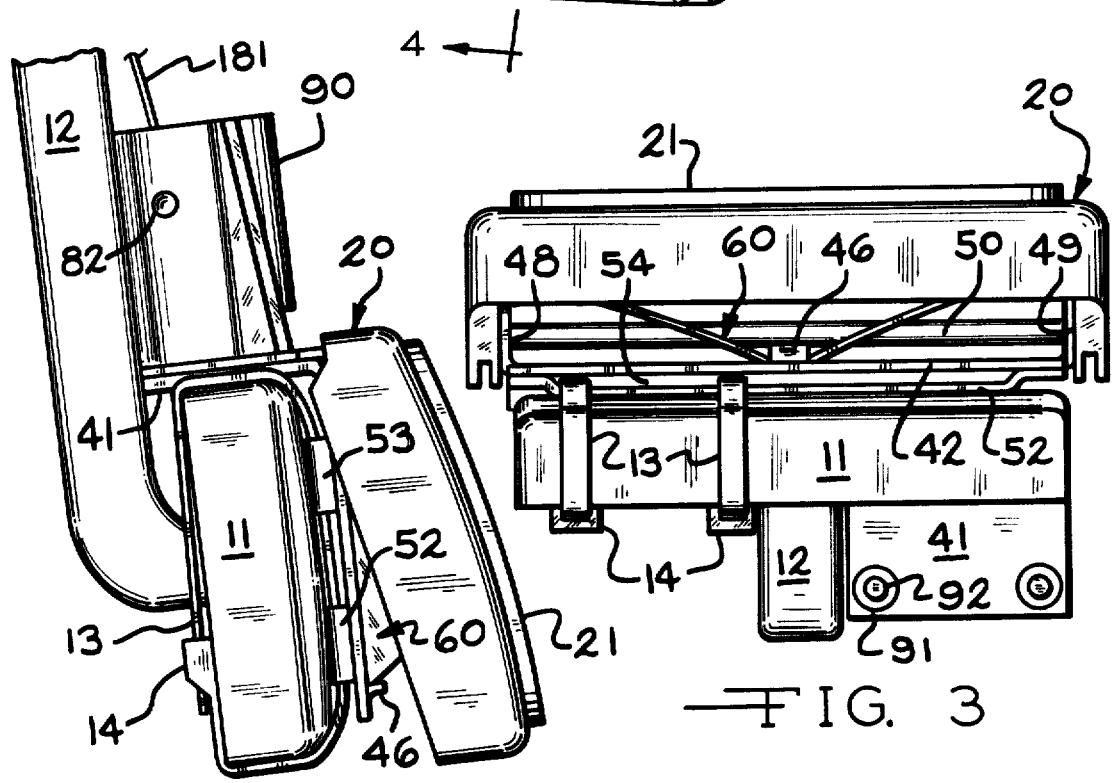

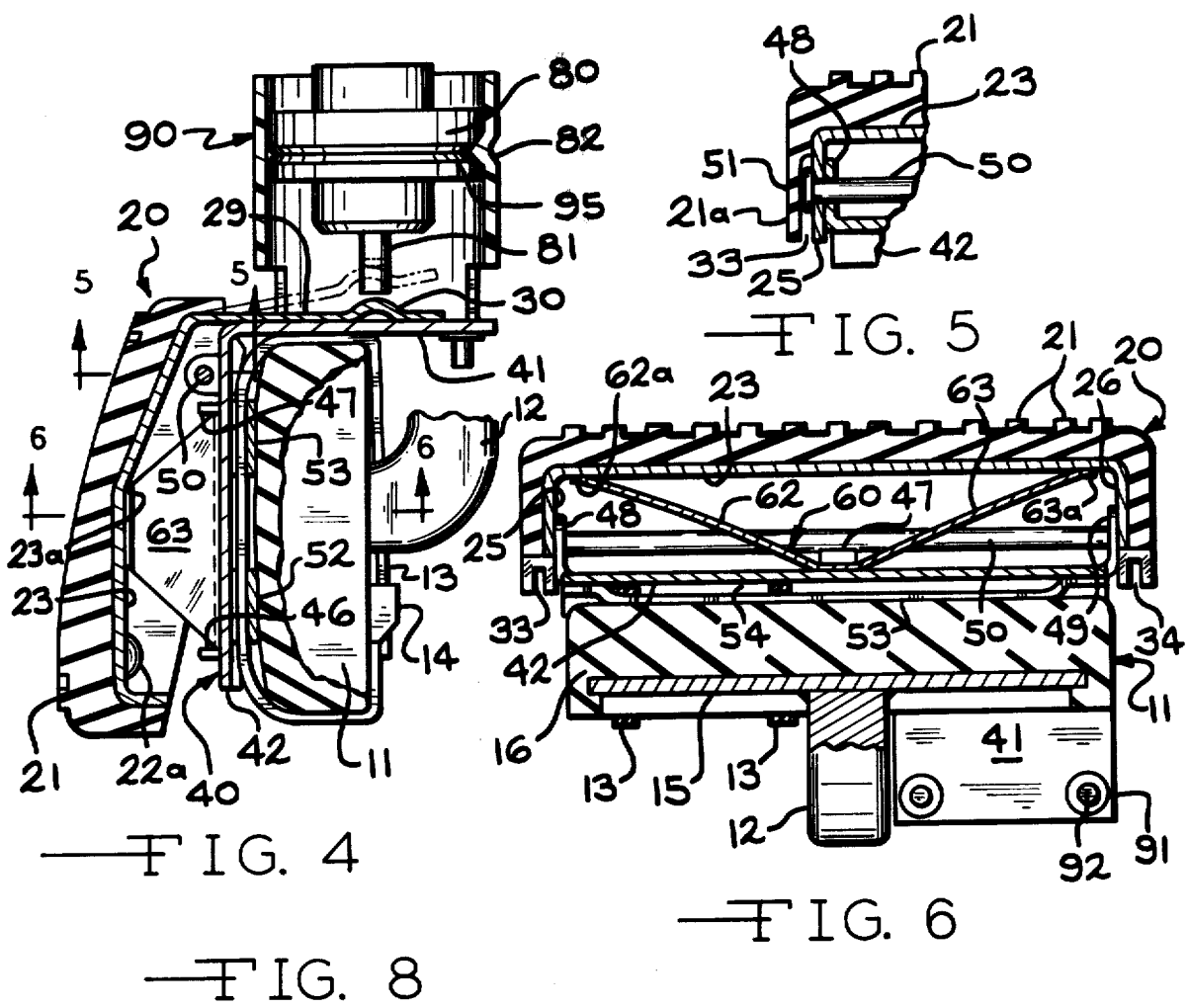

SECONDARY BRAKE PEDAL ASSEMBLY

The present invention relates to the braking of vehicles and, more particularly, to an electric braking system employed in connection with a towed vehicle, pulled by an engine propelled towing vehicle.

Representative of towed vehicles are recreational and utility trailers pulled by a conventional automobile or perhaps by a station wagon, pickup truck or the like. Conventionally, of course, the towing vehicle includes its own braking system whether of conventional brake shoe or disc type brake and, in turn, actuated by a conventional hydraulic brake system. Over the years there has also developed the use of electric brakes for the vehicle being towed. These embody electrically actuated drum brakes which employ an electro magnet attracted to the drum vertical surface to produce an activating force which, in turn, operates through a lever system to expand a more or less conventional pair of drum brake shoes against the side of the drum. In this system, the braking force is produced by the brake shoe itself, not by the magnet. These typical electric brakes can produce braking forces in the order of twelve hundred (1200) pounds when energized with only two (2) amperes of electric current. More recently, there has been developed a solid state control system for such electric brakes and these provide a near theoretical optimum performance. The solid state controlled electric brakes do require an arrangement for signaling and/or for creation of the appropriate variable amperage as will provide a smooth coordinated braking operation as between the primary brakes of the towing vehicle and the electrically actuated brakes of the towed vehicle. Solid state circuitry of particular design and employed in the control system for electrically operated brakes is the subject matter of copending application Ser. No. 15,572, filed Feb. 26, 1979, assigned to the same assignee as the present application.

One of the advantages of the vehicle braking system contemplated in the aforesaid application Ser. No. 15,572 is that it provides a wide range of control over the braking effort of the towed vehicle and, additionally, provides balanced braking between the towed and towing vehicle over a wide range of braking conditions and vehicle weights.

The present invention contemplates a novel piggyback or secondary brake pedal transducer assembly which can be secured to a conventional primary brake pedal of the towing vehicle and which provides features of construction which enable it to translate the foot-applied pressure to the primary brake through an included potentiometer to a solid state circuit controller, according to the aforesaid application, and capable of translating automotive battery twelve (12) volt to a voltage and amperage which will actuate an electric brake to exert a braking force upon the vehicle being towed which is smoothly corresponding to the braking force of the primary brakes on the towing vehicle.

It is still another object of the present invention to provide such an assembly which is easily secureable to a conventional brake pedal and is of relatively low profile and, therefore, relatively inconspicuous.

It is a further object of the present invention to provide such a device which is of extremely simplified design and embodies a minimum of moving parts as to yield performance characteristics which allow a high number of repetitive cycles, e.g. brake pedal actuations without inducement of deteriorating wear or breakdown.

It is also an object of the present invention to provide such an assembly which incorporates a potentiometer facilitating achievement of substantial linearity between the towing vehicle brake effort and towed vehicle brake current.

It is still a further object of the present invention to provide such an assembly which effectively and in straight line function translates the braking pressure applied by the foot to the potentiometer and thereby linearity as to the electric braking force applied to the vehicle being towed.

It is a further object of the present invention to provide such a device of the character described and, particularly a piggy-back brake pedal transducer assembly, which employes a minimum of fasteners and mechanical connectors and thereby precludes breakdown normally associated with such connectors.

It is an additional object of the present invention to provide an add-on or piggy-back brake pedal which incorporates a downwardly pivoting action through a simplified single pin hinge and in which the pin has ends which are recessedly and protectively located and are thus obscure and even hidden and further protected from the liklihood of mechanical interference by reason of foreign bodies carried by the foot of the user.

It is a significant object of the present invention to provide an assembly, and specifically the add-on brake pedal transducer assembly, wherein the linear spring action is accomplished through a unique spring design of tapered butterfly configuration.

It is still another object of the present invention to provide such a construction wherein the tapered, butterfly spring is of multiple leaf design as lends the desired spring rate with a minimum of height above the primary brake pedal surface and, at the same time, through unique design of associated components, said spring floats in a recessed position protected against the elements and requiring no mechanical fastening or securement such as welds, rivets, or the like.

It is a further object of the present invention to provide such a brake pedal transducer assembly construction which is simply and easily constructed and assembled by workmen with a minimum of production or assembly line error.

It is still another object of the present invention to provide such a device which embodies a high cycle life potentiometer which, by reason of the design and relationship of associated parts, can be readily secured into fixed calibrated relationship as between the secondary brake pedal through deflection of the lever arm and a given electrical signal output of the potentiometer.

The foregoing, as well as other object of the present invention, will become apparent to those skilled in the art from the following detailed description taken in conjunction with the annexed sheets of drawings upon which there is presented, for purposes of illustration only, a single and preferred embodiment of the present invention.

IN THE DRAWINGS

FIG. 1 is a three-quarter perspective view of the brake pedal transducer assembly of the present invention mounted upon a primary brake pedal and as casually viewed by a driver or passenger.

FIG. 2 is a side elevation view of the transducer assembly secured to a primary brake pedal.

FIG. 3 is a front elevation view of the assembly and showing, in further detail, its securement to the primary brake pedal.

FIG. 4 is a side section view taken on the line 4—4 in FIG. 1.

FIG. 5 is a partial sectional view taken on the line 5—5 of FIG. 4 and serving to show, in more detail, the hinge connection.

FIG. 6 is a sectional view taken on the line 6—6 of FIG. 4 showing the interior details of construction.

FIG. 7 is a sectional view of the potentiometer member, somewhat enlarged to that shown in FIG. 4.

FIG. 8 is a view taken on the line 8—8 in FIG. 7.

Figure 9:
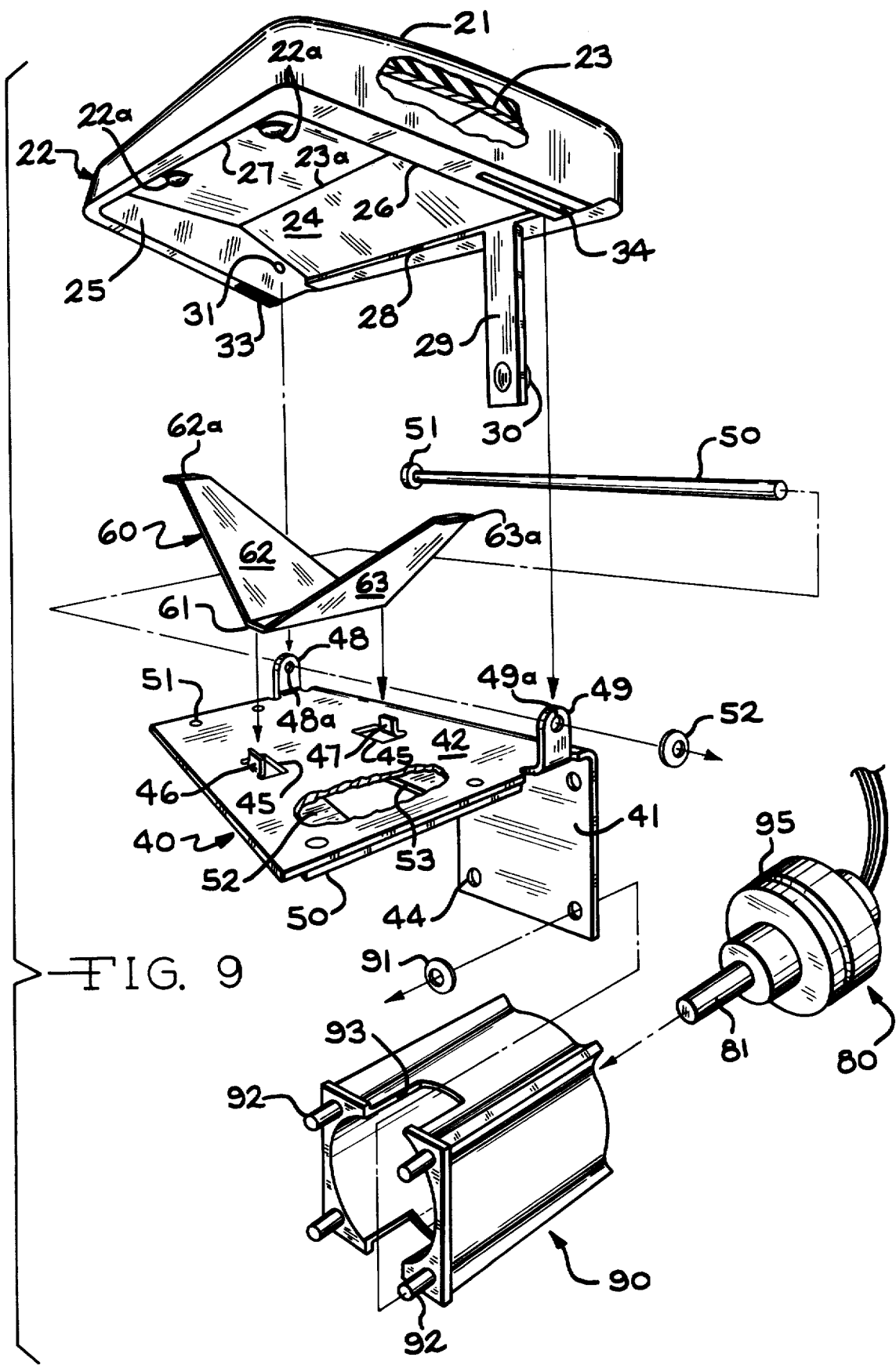
FIG. 9 is an exploded and perspective view of the brake pedal transducer assembly illustrating particular and significant details of construction providing features of advantage in accordance with the present invention.

Viewed most simply, the present invention contemplates a novel, simplified design, add-on brake pedal assembly for a primary brake pedal and being inclusive of unique features of construction which permit the translation of the brake force applied to the primary brake pedal by the driver to an included potentiometer capable of emitting a matched signal whereby, through appropriate solid state circuitry, the electric brakes of the towed vehicle will be actuated across a wide band of braking forces designedly corresponding to the primary braking force of the towing vehicle.

Referring now more specifically to the drawings, there is shown in FIGS. 1 through 3 a primary brake pedal 11, secured in a manner not shown, to the terminal end of a brake pedal arm 12, which proceeds to an unseen hinge arrangement for translating the movement of the arm 12 to appropriate buildup of hydraulic pressure for corresponding actuation of the primary brakes of the towing vehicle.

The add-on or piggy-back brake pedal transducer assembly of the present invention is identified by the reference numeral 20 and is shown, likewise in FIGS. 1, 2 and 3, mounted upon the primary brake pedal 11 and held securely thereto by a pair of elongate virgin plastic ties 13 featuring integral grommets 14 through which the free end of the elongate plastic tie is threaded and tightened; the grommit, including an interior structure, which prevents withdrawal of the length of plastic tie once threaded therethrough. The length of plastic tie also extends through a pair of offset bands or bracket strips constituting segments of the pedal assembly of the present invention in a manner to be described more fully hereinafter to thereby easily secure the assembly reliably and tightly to the brake pedal 11 as shown.

As can be seen in FIGS. 2 and 4, the pedal assembly 20 is angularly disposed to the brake pedal 11 and, in accordance with the present invention, can be deflected to the left, as viewed in FIG. 2, or downwardly as viewed in FIG. 3 or FIG. 1; said movement being reliably, in straight line relationship, translated to a potentiometer located within housing 90 from which extends electrical wiring 18.

The brake pedal assembly 20 of the present invention features on its upper surface a tread 21 for the usual purpose and formed of an elastomer which extends continuously all across the upper surface and continuing downwardly at each marginal edge in an enveloping manner for a purpose to be explained hereinafter.

As can be seen in FIGS. 6, the primary brake pedal 11 is composed of a plate 15 covered with rubber 16; the plate being welded securely to the primary brake pedal arm 12.

For a better understanding of the nature of the invention, reference should now be had to FIG. 9 wherein the brake pedal transducer assembly is shown in perspective with its individual components disassembled in vertically exploded fashion but with guidelines serving to show the manner in which the individual components are interrelated for assembly purposes. The assembly includes a pedal member 22 composed of a metal plate 23 having a configuration shown only partially in dotted outline in FIG. 9 but disclosed additionally in FIGS. 4 and 6. The plate 23 is bent along line 23a. The upper or outer surface of the plate is encapsulated with a thick section of rubber forming the tread 21; the rubber extending about the sides, in a downward direction, to collectively define a recessed region 24 bounded by end walls 25 and 26, a forward wall 27 and a rear edge 28 from which depends a lever arm 29 featuring a button-like projection 30. End wall 25 includes a hole 31 and end wall 26 includes a matching hole 32. The molding of the rubber onto the brake pedal plate is designed to leave voids 33 and 34.

Cooperating with the pedal member 22 is a metal base plate 40 of generally rectangular configuration and having its longer dimension generally corresponding to the distance between the end walls 25 and 26 of the pedal member and its shorter dimension fit between forward wall 27 and rear edge 28 of the pedal member. An integral, generally square ear portion 41 depends, in perpendicular fashion, from the rectangular segment 42. The ear 41 contains four corner mounting holes 44, of which three can be seen. The planar portion 42 includes two spaced, centrally located U-shaped cuts 45 with the region defined by the cuts deformed upwardly to form upstanding abutments 46 and 47. The base plate also includes, in opposed edges, two upturned integral tab members 48 and 49 having respectively apertures 48a and 49a sized to receive a pin 50. Pin 50 has one enlarged cap end 51 and extends from slot 33 to slot 34 through apertures 31 in the end walls 25 and 26 and, simultaneously, the apertures 48a and 49a when the base plate 40 is brought into facing relationship with the upstanding tabs 48 and 49 nesting on the inside surface of the end walls. As shown, the pin 50 can be inserted along the guidelines as shown and with the opposite terminal end secured by friction fastener 52.

Reference numeral 60 identifies a singularly important component of the present invention in the form of a spring having a central segment 61 from which proceeds leaf 62 and leaf 63, each of which tapers from the central segment 61 in oppositely congruent fashion to form wing segments 62 and 63 having terminal slightly flanged ends 62a and 63a. The central segment 61 of the double leaf, tapered, butterfly spring, as described, is sized to just fit in the space between abutments 46 and 47 of base plate 40. The spring 60, from terminal end 62a to end 63a, fits with some clearance therebetween and the closest inner surface of end wall 25 and end wall 26 of the pedal member 20. The clearance between each terminal end of the spring which is shown more clearly in FIG. 6, allows the spring to elongate as the spring is depressed between the pedal member 22 and the base plate 40. A separate bracket 53 is welded to the underside of the base plate 40 via corner spot welds 54. The bracket 53 includes a pair of parallel linear segments 55 and 56 deformed outwardly from plate 40 to define a space 57 accommodating the plastic ties 13 in the securement of the assembly 20 to the primary brake pedal 11 and also includes spaced end regions which flushly abut the under surface of the base plate 40. The bracket 53 is a separate piece welded to the underside of plate 40 thereby avoiding machining of rough edges which are detremental to the plastic ties and which would be otherwise necessary if the segments 53 and 56 were formed as an integral but deformed part of the base plate 40.

It is a significant feature of the present invention that the spring 60 embodies a double leaf 62 and 63 of outwardly tapering flared configuration referred to as a butterfly configuration. The spring 60 of this configuration possesses a desirable linear spring rate under the pressures of various braking pressures to a fully compressed position wherein the bottom surface of the base plate bottoms out against the upwardly projecting buttons 22a on the underside of the pedal member 22. At the same time the spring ends are guided by bend 23 in plate 23 of pedal 22 while the mid region is held between abutments 46 and 47 in the base plate.

It is, additionally and equally, a significant feature of the present invention that the tapered butterfly spring of double leaf characteristic is unsecured, that is, not fastened by welding, rivet, nut and bolt, or other mechanical fastener to either the base plate or the pedal member. The securement or fastening of the spring would inescapably result in the creation of a potentially dangerous localized stress region. Understandably, the transducer brake pedal of the present invention must desirably be capable of enduring literally thousands upon thousands of cycles of foot-actuated depression. And while there are safety features built into the electronic circuitry, which is the subject matter of U.S. patent application Ser. No. 15,572, it is desirable, from the standpoint of service life and safety, to have the spring designed in such manner that avoidable factors leading to damage or deterioration be avoided, if at all possible. The present invention, in its entirety and particularly the novelly designed floating spring, achieves a reliability in this regard by reason of the just described characteristics, principally its one-piece, double-leaf design, its tapered simplicity, its floating yet fixed location and, lastly, its spread, load bearing regions on the under surface of the pedal member. Ideally, the unitary spring is located in the manner shown, that is, with the terminal end regions abutting the underside of the foot pedal 22 and with the central region pressing against the base plate 40. While the reverse positioning is possible, this is, with the spring inverted from the position shown, for example in FIG. 9; the force exerted by the foot would not be spread as evenly and, consequently, the deflection of the lever arm would not be as reliable as in the preferred position as shown in the drawing, specifically FIG. 9. In a similar manner, it is broadly possible to arrange for pivoting action along the bottom or side of the pedal. However, the pivoting action at the top edge of the pedal assembly is preferred in accordance with the present invention because of the reliability of the translation of the primary foot pressure into a potentiometer signal and, additionally, because of the geometry of efficient and economic design of adjacently and complementarily functioning components of the pedal assembly 20 considered overall.

The simplified design of the tapered butterfly double leaf configuration lends a number of other advantages to the foot pedal transducer assembly of this invention. Thus, the spring can be employed in tandem or nested fashion to provide modified spring rate characteristics.

To properly nest two of the springs, the inner spring is desirable slightly shorter so that the terminal end flanges will properly abut the pedal member plate 23. In an opposite, alternate consideration, the spring rate relationship could be modified by an arrangement of two springs with their respective terminal flange portions face-to-face and their mid portions in spaced opposed relationship. Such a modified spring rate could be desirable for certain applications or different potentiometer induced signals or the like. To accommodate such modification of two springs 60 in opposed relationship, the pedal member would require additional machining to form upturned abutments in the underside thereof similar to the abutments 46 and 47 in the base plate.

In the illustration of FIG. 9, it can be seen that the spring, albeit not requiring any physical securement or fastening to either of its adjoining component parts, namely the pedal member 22 or the plate 40, is nonetheless reliably positioned and located securely against any shifting movement. Thus, in the mid region 61 of the spring, there is little or no tolerance between the abutments 46 and 47. See in this regard FIG. 4. Additionally, positional securement is assisted by the relationship of the flanges 62 and 63a of spring 60 against the plate 23 of the pedal member 60 and, specifically, with the one edge of the flange regions 62 and 63a guided by the bend line 23a.

From the just preceding, it can be seen that the facing or opposing surfaces of the pedal member 22 and the plate 40, as constructed, cooperate to confine the movement of the spring 60. Stated another way, the upturned tabs 46 and 47 and bend line 23a, together with the design and configuration of the tapered spring itself, serve to reliably fix the location of the spring in a manner as precludes movement or shifting of the spring. Consequently, the spring can only move in compression or expansion. This, in turn, insures positive accurate movement of the lever arm 29 responsive to foot pressure. Thus, referring to FIG. 4, as pressure is applied to the foot pedal member 20, not only will that force be exerted against the primary brake pedal 11 and brake arm 12 to cause actuation of the primary brakes, but also against the flanged ends of the spring 60 causing it to become slightly compressed and allowing pedal member plate to move toward the base plate and contemporaneously causing the lever arm 29 to pivot about the pin 50 in a direction away from ear portion 41 urging button contact 30 against plunger 81 emerging from potentiometer 80 located within the housing 90. The deflection of the plunger 81, responsive to pivotal movement of the arm 29, translates itself into an electric signal which, through appropriate circuitry, is translated into an electrical braking force in the form of prescribed voltage and/or amperage.

The potentiometer 80 includes an outer case 82 of an insulating plastic material such as a phenolic or any other suitable plastic compound. The plunger 81 is moveable longitudinally in the potentiometer and rides upon a guide pin 83 encircled by a spring 84 resisting the plunger. The plunger's outermost spring-urged position is limited by a shoulder 85 resting against the inside of the case. The potentiometer 80 includes a generally cylindrical interior chamber 86 in which the plunger 81, guide pin 83 and spring 84 are located and closed by a bottom wall plug 87 against which the spring seats. Also located within the chamber 86 is a resistance board or element 88. Leads 181, 182 and 183 are suitably connected to the resistance board and brought to the outside of the case of the potentiometer. The connections of the leads to the resistance board are identified by the reference numeral 89 and these and the resistance board 88 are also shown in FIG. 8. Returning however to FIG. 7, attached to the plunger 81 is a contact element 70 which moves slidingly in surface contact with the resistance board 88 as the plunger is deflected. This surface contact with the board is shown in phantom outline in FIG. 8. It can be seen that as the plunger 81 moves downwardly, the contact 70 will contact or engage different conductive portions 88a, 88b and 88c. Depending upon the portion of the resistance board and contacts engaged by the contact 70, different and varying electrical signals in the form of voltage are sent through appropriate circuitry to the electric brake for appropriate acutation in synchronous and controlled relationship.

A desirable feature of the present invention resides in the location of the potentiometer within the housing 90 carried by the ear 41 and secured thereto by engagement of the lock ring 91, of which there are four, with the projecting studs 92 at the base of the potentiometer and projecting through holes 44 in ear 41 in the manner indicated by the guidelines in FIG. 9 and as ultimately shown in FIG. 4. The housing 90 for the potentiometer includes a cutout or void 93 to accommodate entry of the lever arm 29 into the position shown in FIG. 4. The housing and protectively included potentiometer is thusly situated to the rear of the brake pedal in a manner as will not interfere with the foot of the operator and yet capable of receiving a direct response to foot pressure applied to pedal 20.

As can be seen from perhaps FIG. 9 and, as well, the other drawings, the component parts are extremely few in number and lend themselves to assembly in a facile manner with a minimum of possibilities for error and, accordingly, facilitating production efficiency and economy. It is a particularly desired feature of the present invention that the assembly components are reliably held together by the cooperative design characteristics enumerated herein. Included in this category is the provision for the voids 33 and 34 in the molding of the brake pedal member and the cojointly formed overlap 21a at either end of hinge pin 50. The voids and overlap 21a (see FIG. 5) permit movement of the overlap for insertion of the hinge pin through the apertures 31 and 32 in the downturned flange portions 25 and 26 of the pedal member and the ear portions of the base plate to create the hinged assembly of pedal member 22 and base plate 40. And while the lock member 52 (see FIG. 9) serves to lock the pin of one end and the enlarged end 51 at the other, it can be seen that the overlap region 21a, even though the retainer lock 52 might fail, prevents accidental withdrawal or falling out of the pin 50.

From FIG. 9, it can be further seen that the spring 60, pedal member 22 and base plate 40 are easily assembled together and the pin inserted in the manner indicated by the guidelines. Thereafter, the housing 90 is secured to the ear portion 41. The last step of the assembly is then simply the insertion into the housing 90 of the potentiometer member 80. This operation is easily accomplished since the inside diameter of the housing and the outside diameter of the potentiometer are such as to allow sliding insertion of the potentiometer coaxially within the housing as illustrated in FIG. 9 and indicated by the arrow.

In accordance with the present invention, the securement of the potentiometer within the housing is carried out simultaneously with calibration of the overall assembly. To accomplish this, the electrical leads of the potentiometer are connected to an appropriate meter readout of the signal produced by the potentiometer corresponding to its plunger deflection. The potentiometer is adjustably moved within the housing to contact the plunger with the lever contact 30. Next, a known foot pressure is applied to the pedal and the potentiometer axial location or position within the housing is adjusted until the readout corresponds to the pressure being applied to the pedal. Immediately, as this calibration is achieved, heated elements are impressed from different angles against the side of the plastic housing to heat deform the housing wall into a groove 95 in the outer surface of the potentiometer as seen in FIG. 4. Preferably this is achieved at three radially spaced points around the circumference of the groove through utilization of a suitable jig supporting the heated elements. One heat formed indentation, identified by the reference numeral 98, is shown in FIG. 4. The indentations are also referred to as "heat stakes."

From the standpoint of design simplicity and adaptability for unsecured or floating positioning, a possible alternate to the tapered butterfly spring is the employment of a Belville washer. In section, the profile configuration of the Belville washer is quite similar to the preferred tapered butterfly spring of the present invention. In view of the fact, however, that its fabrication includes considerable deformation and probably attendant molecular rearrangement and induced stress points, it would not likely possess the repetitive cycle life expentancy as the tapered butterfly spring which is, accordingly, preferred.

From the foregoing rather detailed description, it will be appreciated by those skilled in the art that various changes, modifications and substitutions can be readily made in the construction as shown. Accordingly, it is intended that all such obvious modifications, changes and substitutions are to be included within the spirit and scope of the present invention unless such would do violence to the language of the appended claims.

We claim:

1. A brake pedal transducer assembly adapted for securement to a primary brake pedal to translate foot-applied pressure necessary to achieve a given primary braking pressure for a towing vehicle to an electric signal yieldative of a corresponding electric brake force for a towed vehicle, said assembly comprising:
   (1) a base plate having a lower surface abutting the tread surface of a primary brake pedal and being securable to said primary brake pedal, said plate including an integral ear portion extending downwardly behind said primary brake pedal,
   (2) a pedal member hingedly connected to said base plate, said hinged connection allowing relative pivotal movement as between said pedal member and said base plate, said pedal member including a generally upper tread surface for receiving foot-applied pressure and an integral lever arm projecting downwardly with respect to said tread surface,
   (3) spring means situated between said base plate and pedal member and serving to resist pivotal movement of said pedal member toward said base plate and, in turn, a corresponding movement of said lever arm,
   (4) a housing mounted on said base plate ear portion and extending rearwardly thereof, said housing being constructed and arranged to accommodate said lever arm and (5) potentiometer means mounted within said housing, said potentiometer including a plunger preselectively positioned for axial movement responsive to contacting deflection of said lever arm.

2. The invention as claimed in claim 1, wherein said hinged connection is located along the upper edge of said base plate and pedal member.

3. A brake pedal transducer assembly adapted for securement to a primary brake pedal to translate foot-applied pressure, necessary to achieve a given primary braking pressure for a towing vehicle, to an electric signal yieldative of a corresponding electric brake force for a towed vehicle, said assembly comprising:

(1) means for securing said assembly to a primary brake pedal;

(2) means for receiving foot-applied pressure;

(3) floating spring means to yieldingly oppose said foot-applied pressure;

(4) means for measuring the amount of yielding of said resistance means responsive to said foot-applied pressure; and (5) potentiometer means responsive to said measuring means thereby translating said foot-applied pressure to said electric signal.

4. A brake pedal transducer assembly adapted for securement to a primary brake pedal to translate foot-applied pressure, necessary to achieve a given primary braking pressure for a towing vehicle, to an electric signal yieldative of a corresponding electric brake force for a towed vehicle, said assembly comprising:

(1) means for securing said assembly to a primary brake pedal;

(2) means for receiving foot-applied pressure;

(3) resistance means for yieldingly oppose said foot-applied pressure, said resistance means including a unitary spring structure having dihedral wing segments joined by a central region and thereby yieldative of a double leaf spring action providing linearity of deflection responsive to foot-applied pressure;

(4) means for measuring the amount of yielding of said resistance means responsive to said foot-applied pressure; and (5) potentiometer means responsive to said measuring means thereby translating said foot-applied pressure to said electric signal.

5. The invention as claimed in claim 3, wherein said resistance means comprises a unitary spring structure featuring dihedral, wing segments joined by a central region and thereby yieldative of a double leaf spring action providing linearity of deflection responsive to foot-applied pressure.

6. The invention as claimed in claim 2, wherein said base plate includes a pair of upstanding opposed ears adjacent said upper edge, said panel member including marginal depending side wall segments adjacent said upper edge and said ears and wall segments flushly abut in matched pairs and include aperatures in registry to receive an elongate pin to, in concert, define said hinged connection.

* * * * *